US008725185B2

(12) United States Patent
Ozaki et al.

(10) Patent No.: US 8,725,185 B2
(45) Date of Patent: May 13, 2014

(54) MOBILE BASE STATION, MOBILE TERMINAL, MOBILE COMMUNICATIONS SYSTEM AND METHOD

(75) Inventors: Kazuyuki Ozaki, Kawasaki (JP); Yuuta Nakaya, Kawasaki (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 526 days.

(21) Appl. No.: 12/779,037

(22) Filed: May 12, 2010

(65) Prior Publication Data

US 2010/0291957 A1 Nov. 18, 2010

(30) Foreign Application Priority Data

May 18, 2009 (JP) ................................. 2009-120004

(51) Int. Cl.
*H04W 72/04* (2009.01)

(52) U.S. Cl.
USPC .............. 455/509; 455/11.1; 455/7; 455/450; 455/456.5; 455/515; 370/329

(58) Field of Classification Search
USPC ................ 455/67.1, 423, 436, 509, 441, 434, 455/435.1, 435.2, 439, 450, 454, 464, 515, 455/552.1; 370/337, 347, 230, 441, 312; 375/260, 267, 259, 284, 285, 295
See application file for complete search history.

(56) References Cited

U.S. PATENT DOCUMENTS

| | | | | |
|---|---|---|---|---|
| 4,924,211 | A | * | 5/1990 | Davies ........................ 340/573.4 |
| 5,697,054 | A | * | 12/1997 | Andersson .................... 455/524 |
| 5,852,405 | A | * | 12/1998 | Yoneda et al. ................ 370/328 |
| 6,243,575 | B1 | * | 6/2001 | Ohyama et al. ............ 455/456.4 |
| 8,054,899 | B2 | * | 11/2011 | Kogawa ........................ 375/260 |
| 8,165,073 | B2 | * | 4/2012 | Wang et al. ................... 370/329 |
| 2003/0003874 | A1 | | 1/2003 | Nitta et al. |
| 2003/0072295 | A1 | * | 4/2003 | Maxemchuk ................. 370/348 |
| 2004/0156386 | A1 | * | 8/2004 | Atarashi et al. .............. 370/441 |
| 2004/0198386 | A1 | * | 10/2004 | Dupray ...................... 455/456.1 |
| 2005/0037798 | A1 | * | 2/2005 | Yamashita et al. ........... 455/525 |
| 2005/0164706 | A1 | * | 7/2005 | Wakabayashi ............... 455/441 |
| 2005/0243776 | A1 | * | 11/2005 | Kawabata et al. ............ 370/337 |
| 2007/0173269 | A1 | * | 7/2007 | Laroia et al. ................. 455/500 |

(Continued)

FOREIGN PATENT DOCUMENTS

| | | |
|---|---|---|
| JP | 07-038953 | 2/1995 |
| JP | 8-256153 | 10/1996 |

(Continued)

OTHER PUBLICATIONS

Japanese Office Action mailed Dec. 18, 2012 for corresponding Japanese Application No. 2009-120004, with partial English-language translation.

*Primary Examiner* — Tan Trinh
(74) *Attorney, Agent, or Firm* — Fujitsu Patent Center (57) ABSTRACT

A mobile base station includes a detecting unit that detects communication information concerning another cell; a switching unit that based on the detected communication information, switches a communication resource used by the mobile base station to a communication resource different from that used in the other cell; a communication resource reporting unit that reports to a mobile terminal in a cell of the mobile base station, the communication resource switched to by the switching unit; and a communication information reporting unit that reports to a base station outside the cell of the mobile base station, communication information concerning the communication resource switched to by the switching unit.

10 Claims, 8 Drawing Sheets

(56) References Cited

U.S. PATENT DOCUMENTS

| | | | |
|---|---|---|---|
| 2007/0224987 A1* | 9/2007 | Ishii | 455/436 |
| 2008/0031197 A1* | 2/2008 | Wang et al. | 370/331 |
| 2009/0010357 A1* | 1/2009 | Kogawa | 375/295 |
| 2009/0111501 A1* | 4/2009 | Tang et al. | 455/522 |
| 2009/0227263 A1* | 9/2009 | Agrawal et al. | 455/452.1 |
| 2010/0273468 A1* | 10/2010 | Bienas et al. | 455/418 |
| 2010/0273504 A1* | 10/2010 | Bull et al. | 455/456.1 |
| 2011/0021221 A1* | 1/2011 | Kondo | 455/501 |
| 2012/0002585 A1* | 1/2012 | Kawabata et al. | 370/312 |
| 2013/0316738 A1* | 11/2013 | Noonan | 455/456.4 |
| 2014/0018059 A1* | 1/2014 | Noonan | 455/419 |

FOREIGN PATENT DOCUMENTS

| | | |
|---|---|---|
| JP | 10-066138 A | 3/1998 |
| JP | 2002-159055 A | 5/2002 |
| JP | 2002-335573 A | 11/2002 |
| JP | 2003-018073 A | 1/2003 |

\* cited by examiner

MOBILE BASE STATION, MOBILE TERMINAL, MOBILE COMMUNICATIONS SYSTEM AND METHOD

CROSS REFERENCE TO RELATED APPLICATIONS

This application is based upon and claims the benefit of priority of the prior Japanese Patent Application No. 2009-120004, filed on May 18, 2009, the entire contents of which are incorporated herein by reference.

FIELD

The embodiments discussed herein are related to a mobile base station, a mobile terminal, a mobile communication system and method.

BACKGROUND

In a mobile communication system, a base station that is equipped on a mobile object, such a vehicle, and thus is mobile together with the mobile object is conventionally known. A method for controlling operation of such a mobile base station is known where the mobile station is connected to a mobile communication system through radio relay and executes an information acquiring procedure to acquire estimate basic information for estimating radio wave interference with other base stations; an interference estimating procedure to estimate, based on the acquired estimate basic information, the state of radio wave interference with other base stations; and a control procedure to control, based on the estimated radio interference state, operation of the mobile base station (see, for example, Japanese Laid-Open Patent Publication No. 2003-18073).

Conventional approaches are to control the operation of mobile base stations so that radio wave interference between base stations does not occur in a state where the base stations receive the radio waves of one another. Thus, in a state where base stations do not receive the radio waves of one another, the respective mobile base stations thereof are at risk of becoming hidden nodes. For example, for two given mobile base stations, although radio waves of one do not reach the other and vice versa, a portion of the respective cells may be overlapping. When mobile base stations do not receive radio waves of one another, both mobile base stations may be using the same radio resource. If both mobile base stations are using the same radio resource, packet collision may occur with respect to a mobile terminal in the overlapping area, arising in a problem that communication with the mobile base station cannot be performed.

SUMMARY

According to an aspect of an embodiment, a mobile base station includes a detecting unit that detects communication information concerning another cell; a switching unit that based on the detected communication information, switches a communication resource used by the mobile base station to a communication resource different from that used in the other cell; a communication resource reporting unit that reports to a mobile terminal in a cell of the mobile base station, the communication resource switched to by the switching unit; and a communication information reporting unit that reports to a base station outside the cell of the mobile base station, communication information concerning the communication resource switched to by the switching unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. In each of the embodiments, like components are indicated by like reference characters and redundant description is omitted herein.

Figure 1:
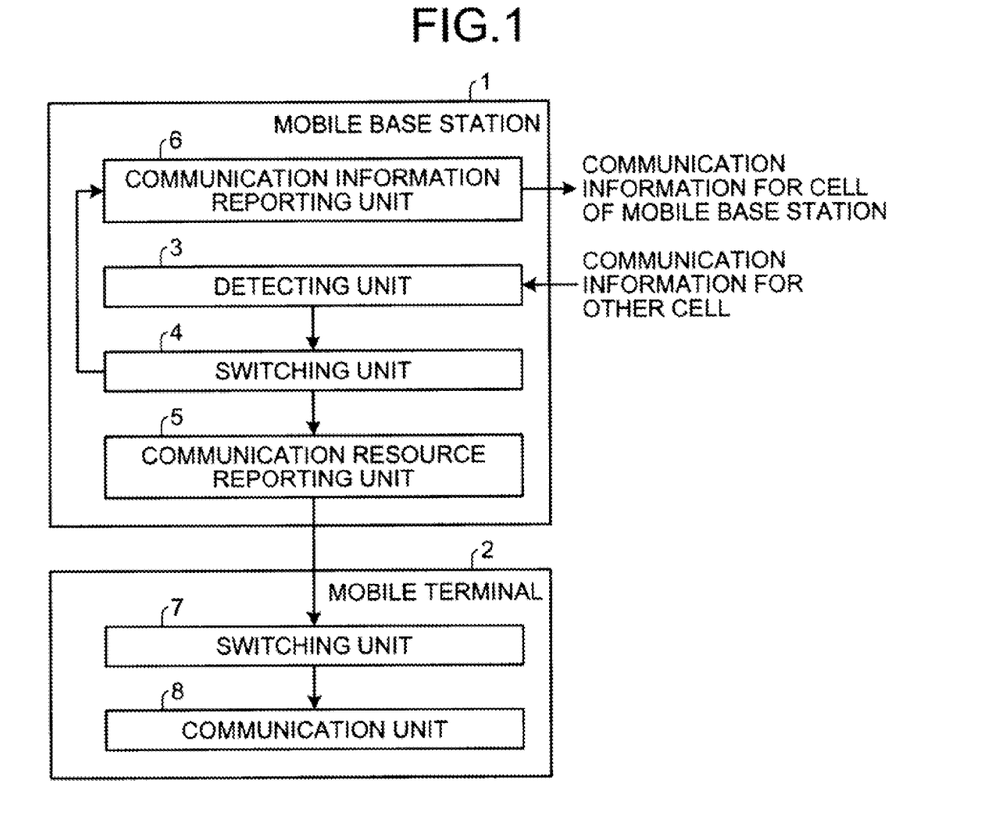
FIG. 1 is a block diagram of a mobile communication system according to a first embodiment.

FIG. 1 is a block diagram of a mobile communication system according to a first embodiment. As depicted in FIG. 1, the mobile communication system includes a mobile base station 1 and a mobile terminal 2. The mobile base station 1 includes a detecting unit 3, a switching unit 4, a communication resource reporting unit 5, and a communication information reporting unit 6. The detecting unit 3 detects communication information of other cells. The switching unit 4, based on the communication information detected by the detecting unit 3, switches the communication resource to be used by the mobile base station 1, to a communication resource that is different from the communication resources being used by the other cells. The communication resource reporting unit 5 reports to the mobile terminal 2 in the cell of the mobile base station 1, the communication resource switched to by the switching unit 4. The communication information reporting unit 6 reports to non-depicted base stations outside the cell of the mobile base station 1, communication information concerning the communication resource switched to by the switching unit 4. The mobile terminal 2 includes a switching unit 7 and a communication unit 8. At the mobile terminal 2, the switching unit 7 switches the communication resource, based on the communication information reported by the mobile base station 1 (in FIG. 1, communication information for the cell of the mobile terminal 2). The communication unit 8, using the communication resource switched to by the switching unit 7 of the mobile terminal 2, communicates with the mobile base station 1.

Figure 2:
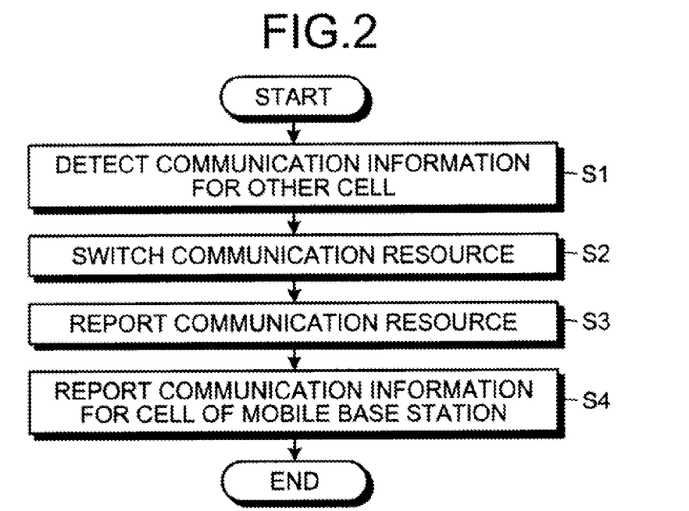
FIG. 2 is a flowchart of a processing procedure of the mobile communication system according to the first embodiment.

FIG. 2 is a flowchart of a processing procedure of the mobile communication system according to the first embodiment. As depicted in FIG. 2, at the mobile base station 1, the detecting unit 3 detects communication information of another cell (step S1). The switching unit 4 of the mobile base station 1, based on the information detected by the detecting unit 3, switches the communication resource to be used by the mobile base station 1, to a communication resource that is different from the communication resource being used in the other cell (step S2). The communication resource reporting unit 5 of the mobile base station 1 reports to the mobile terminal 2 in the cell of the mobile base station 1, the communication resource switched to by the switching unit 4 (step S3). The communication information reporting unit 6 of the mobile base station 1 reports to a base station outside the cell of the mobile base station 1, communication information concerning the communication resource switched to by the switching unit 4 (step S4). The processes at step S3 and step S4 may be reversed in sequence.

The configuration and processing procedure of a mobile communication system as well as the respective configurations of a mobile base station and a mobile terminal according to a second embodiment are identical to that of the first embodiment. Hereinafter, configurations of components of the mobile base station are described.

Figure 3:
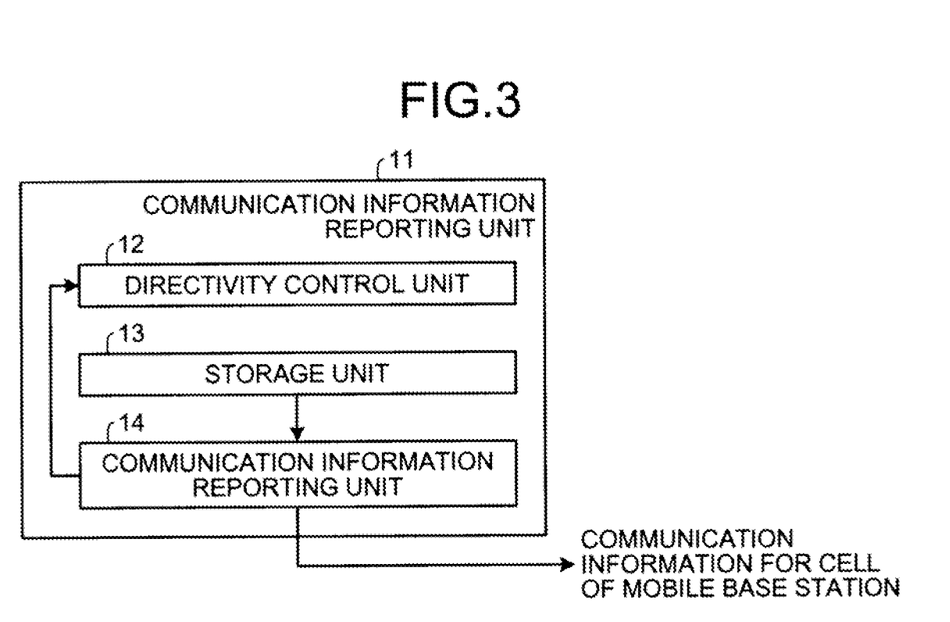
FIG. 3 is a block diagram of a first example of a communication information reporting unit.

FIG. 3 is a block diagram of a first example of the communication information reporting unit. As depicted in FIG. 3, a communication information reporting unit 11 includes a directivity control unit 12 for an antenna, a storage unit 13, and a communication information reporting unit 14. The directivity control unit 12 forms a directional beam about the mobile base station. The directivity control unit 12, by controlling the directivity of a non-depicted antenna, temporally varies the direction of the directional beam. The directivity control unit 12 may be implemented by hardware or by an execution of a program that controls directivity of the antenna and is executed by a processor. The storage unit 13 stores therein communication information for the current cell of the mobile base station. The communication information reporting unit 14 transmits in the direction of the directional beam formed by the directivity control unit 12, the communication information that is for the cell of the mobile base station and stored in the storage unit 13. The communication information includes, for example, information concerning the communication resource being used in the cell. The communication information may include positional information for the mobile base station and information concerning the priority level. An example of a communication resource includes frequency, time, or code. Communication resource information included in communication information is, for example, at least one among frequency information, time information, and code information. According to the first example of the communication information reporting unit, since communication information for the cell is formed into a directional beam and transmitted, compared to transmission without forming a directional beam, the communication information reaches a farther destination. Thus, among mobile base stations located at distances at which communication cannot be performed without directional beam formation, a mobile base station can report communication information for the cell thereof to another mobile base station.

Figure 4:
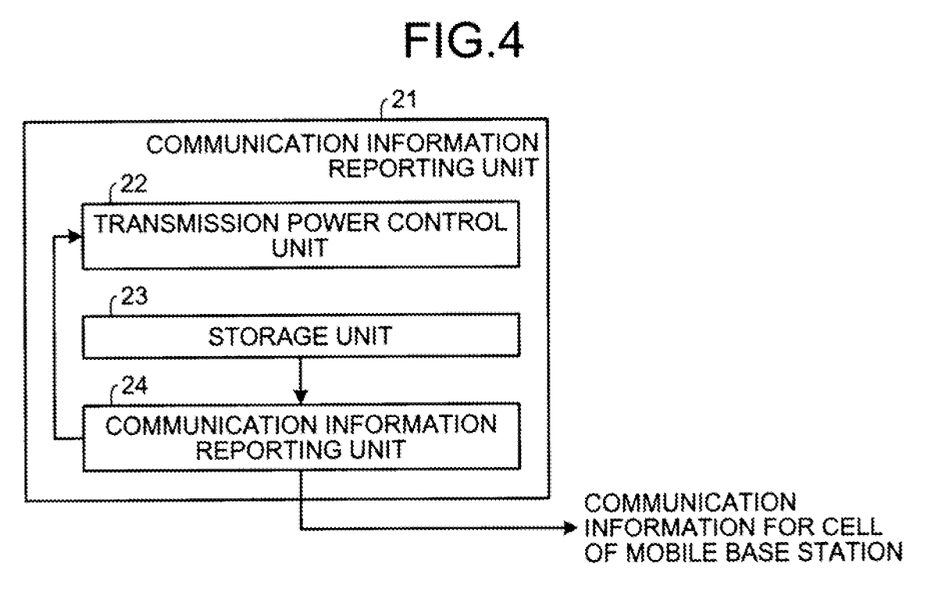
FIG. 4 is a block diagram of a second example of the communication information reporting unit.

FIG. 4 is a block diagram of a second example of the communication information reporting unit. As depicted in FIG. 4, a communication information reporting unit 21 includes a transmission power control unit 22, a storage unit 23, and a communication information reporting unit 24. The transmission power control unit 22 temporally increases the transmission power. The storage unit 23 is identical to the storage unit of the first example of the communication information reporting unit. The communication information reporting unit 24 transmits, at the transmission power increased by the transmission power control unit 22, the communication information that is for the cell of the mobile base station and stored in the storage unit 23. According to the second example of the communication information reporting unit, communication information concerning the cell is transmitted at a higher transmission power than the transmission power for communication with a subordinate mobile terminal and hence, compared to communication with a subordinate mobile terminal, the communication information reaches a farther destination. Thus, among mobile base stations that are separated by distances at which communication with subordinate mobile terminals cannot be conducted, a mobile base station can report communication information for the cell thereof to another mobile base station.

Figure 5:
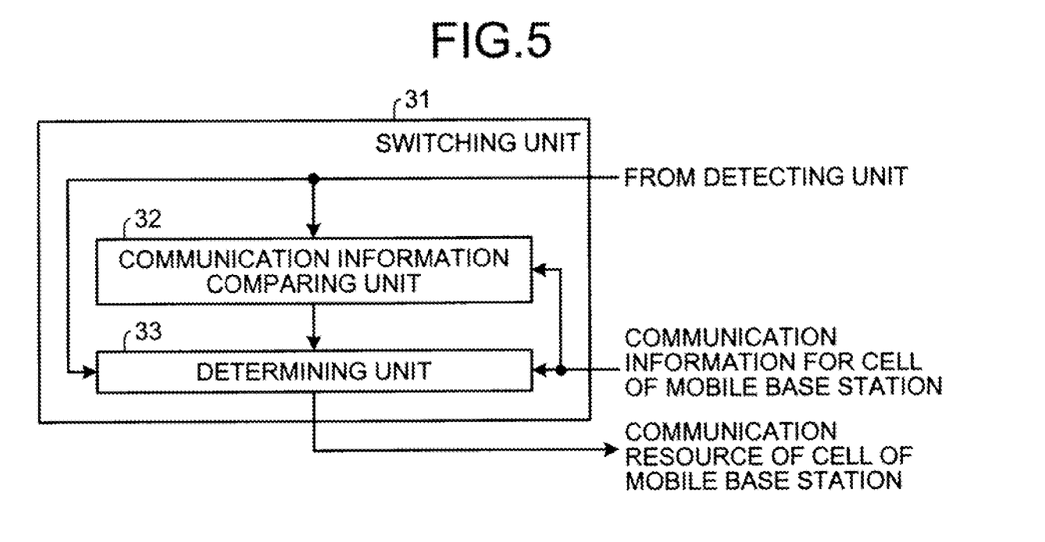
FIG. 5 is a block diagram of a switching unit.

FIG. 5 is a block diagram of the switching unit. As depicted in FIG. 5, a switching unit 31 includes a communication information comparing unit 32 and a determining unit 33. The communication comparing unit 32 compares the communication information for the cell of the mobile base station and the communication information that is for another cell and detected by the detecting unit. The determining unit 33 determines, as a communication resource of the cell of the mobile base station, a communication resource that is different from the communication resource being used in the other cell, if a result is received from the communication information comparing unit 32 indicating that the communication resource of the cell of the mobile base station is to be switched. The determining unit 33 outputs the determined communication resource.

Figure 6:
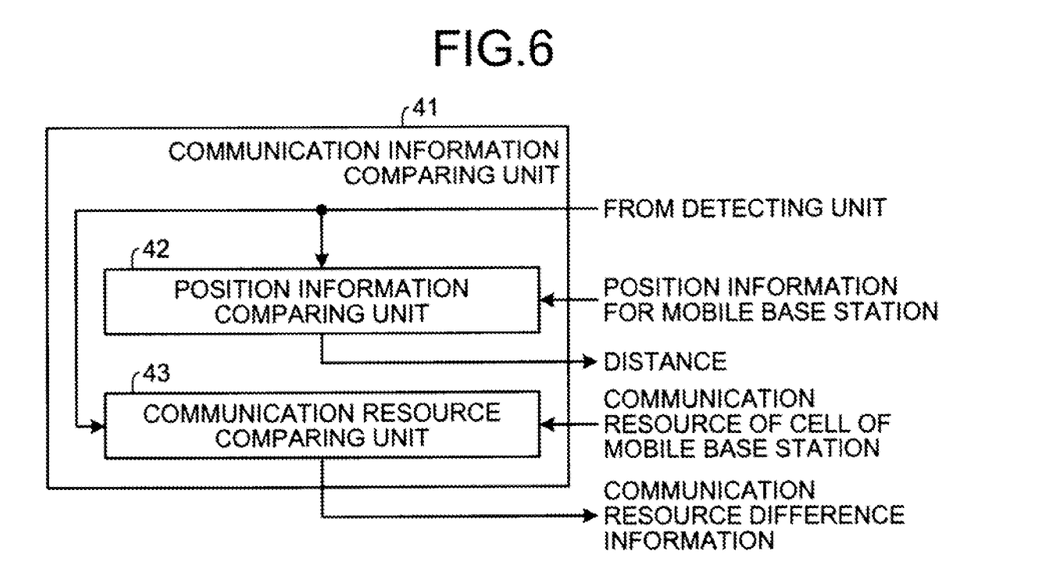
FIG. 6 is a block diagram of a first example of a communication information comparing unit.

FIG. 6 is a block diagram of a first example of the communication information comparing unit. As depicted in FIG. 6, a communication information comparing unit 41 includes a position information comparing unit 42 and a communication resource comparing unit 43. The position information comparing unit 42 compares position information for the mobile base station and position information that is for another mobile base station and included in the communication information detected by the detecting unit. The position information comparing unit 42 calculates the distance between the mobile base station and the other mobile base station and outputs the distance. The position information for the mobile base station according to second embodiment is, for example, obtained from a global positioning system (GPS), a system using an optical beacon, etc. A GPS receiver may be provided in a base station apparatus of the mobile base station, e.g., the GPS receiver may be provided on the mobile object, such as a vehicle, equipped with the base station apparatus. The communication resource comparing unit 43 compares communication resource information for the cell of the mobile base station and communication resource information that is for another cell and included in the communication information for the other cell, to obtain a difference. The communication resource comparing unit 43 outputs the difference as communication resource difference information. According to the first example of the communication information comparing unit, based on the distance between the mobile base station and another mobile base station, communication resources can be controlled. For example, control can be performed such that the mobile base station communication resource is switched if the mobile base station and another mobile base station are close enough for interference to occur; and communication resources are not switched if the mobile base stations are at a distance where interference does not occur.

Figure 7:
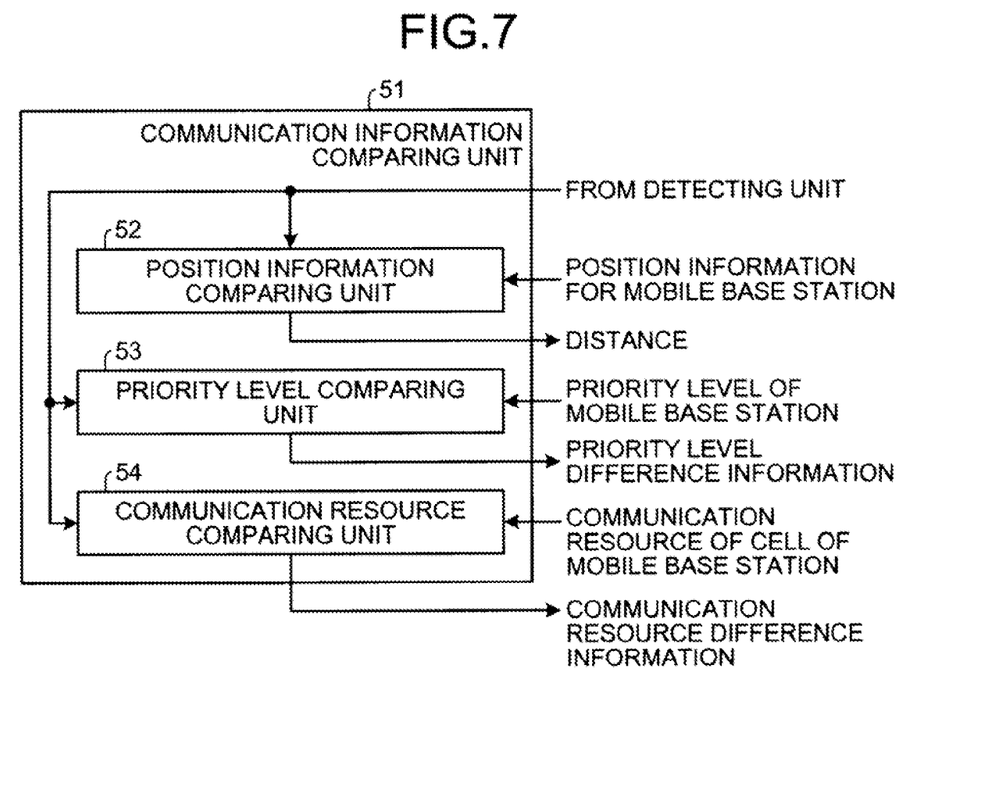
FIG. 7 is a block diagram of a second example of the communication information comparing unit.

FIG. 7 is a block diagram of a second example of the communication information comparing unit. As depicted in FIG. 7, a communication information comparing unit 51 includes a position information comparing unit 52, a priority level comparing unit 53, and a communication resource comparing unit 54. The position information comparing unit 52 and the communication resource comparing unit 54 are respectively identical to the position information comparing unit and the communication resource comparing unit of the first example of the communication information comparing unit. The priority level comparing unit 53 compares priority level information for the mobile base station and priority level information that is for another cell and included in the communication information detected by the detecting unit, and outputs a difference between the priority levels. The priority level of each mobile base station may be set in advance. A mobile base station having high priority is, for example, a police vehicle, an ambulance, etc. equipped with a base station apparatus. Further, the priority level of each mobile base station may be assigned according to the importance of the communication performed by the mobile base station. Communication of high importance is, for example, communication concerning damage at the time of a disaster, rescue, etc. According to the second example of the communication information comparing unit, by a setting of priority levels for mobile base stations, communication among police vehicles and among ambulances is possible and thus, interference among police vehicles and among ambulances can be prevented. Further, since communication among vehicles engaged in rescue and recovery work in a disaster area is possible, interference among such vehicles can be prevented.

In the first example or the second example of the communication information comparing unit, the distance between the mobile base station according to the second embodiment and another mobile base station may be the linear distance between the mobile base stations. Further, the distance may be one that takes into consideration the environment between the mobile base stations, e.g., the surrounding environment of the mobile base station and that of another mobile base station. For example, the average interval length of the average power is expressed by equation (1), where A and α are constants determined by frequency, antenna height, etc. and r is the linear distance between 2 base stations. Using α correlated in advance with position information for the mobile base station and position information for another mobile base station and reception power P included in the communication information for the other cell, the distance r' between two pseudo base stations can be obtained. The distance r' between the two pseudo base stations is the distance between two mobile base stations taking into consideration surrounding environments thereof. r' is expressed by equation (2). When the distance between two mobile base stations taking into to consideration the surrounding environments in this way, is used, the environment of each mobile base station and the environment between mobile base stations can be taken into consideration to switch communication resources.

$$A \times r^{-\alpha} \quad (1)$$

$$r' = \sqrt[\alpha]{\frac{A}{P}} \quad (2)$$

Figure 8:
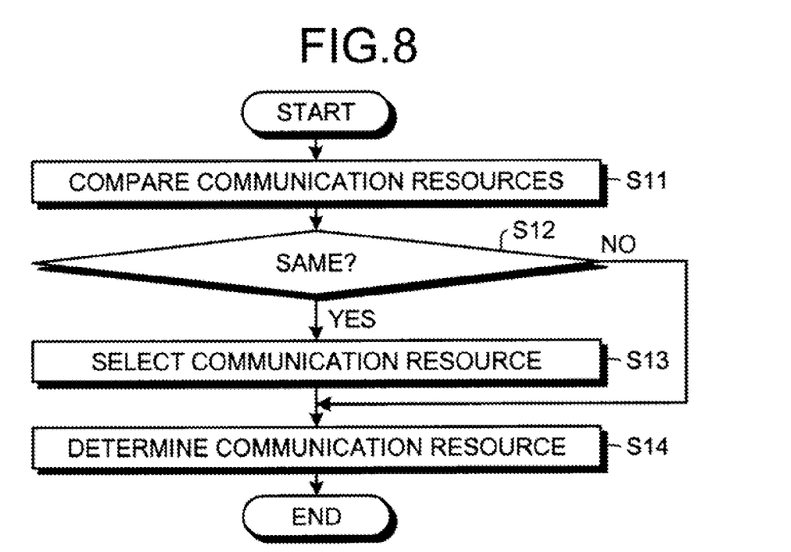
FIG. 8 is a flowchart of a first example of the processing procedure of the mobile base station.

FIG. 8 is a flowchart of a first example of the processing procedure of the mobile base station. As depicted in FIG. 8, the processing begins and if the distance between the mobile base station and another mobile base station is equal to less than a threshold, at the mobile base station, the communication resource comparing unit compares the communication resource of the cell of the mobile base station and the communication resource that is for the cell of the other mobile base station and included in the communication information detected by the detecting unit (step S11). If the comparison indicates that the communication resources are difference (step S12: NO), the determining unit determines the current communication resource to be the communication resource of the cell of the mobile base station (step S14) and does not switch communication resources, ending the processing. On the other hand, if the communication resources are the same (step S12: YES), the determining unit, for example, randomly selects a usable communication resource, i.e., selects a communication resource from among communication resources not used by other cells, to be used for the cell of the mobile base station (step S13). Next, the determining unit determines the selected communication resource to be the communication resource of the cell of the mobile base station (step S14), ending the processing.

Figure 9:
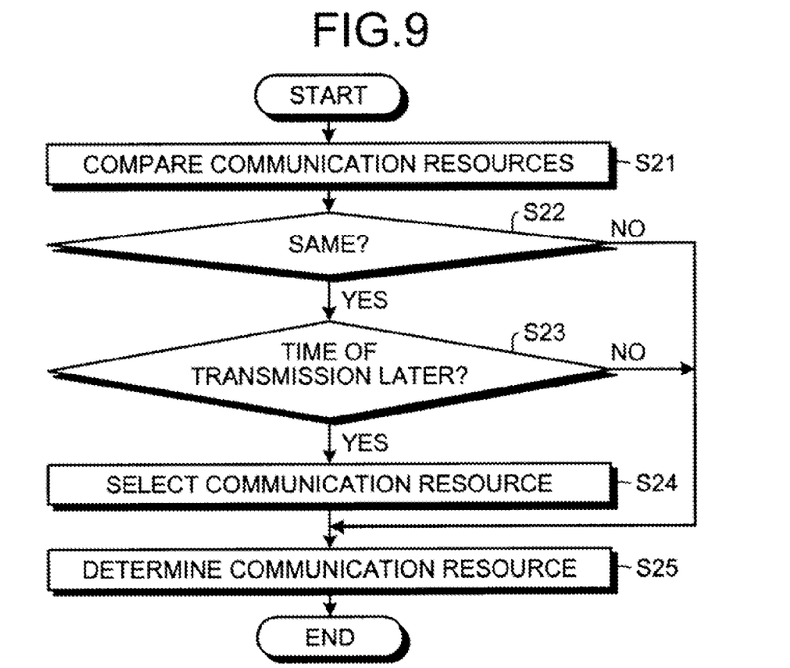
FIG. 9 is a flowchart of a second example of the processing procedure of the mobile base station.

FIG. 9 is a flowchart of a second example of the processing procedure of the mobile base station. As depicted in FIG. 9, in the second example of the processing procedure, step S21, step S22, step S24, and step S25 are respectively identical to step S11, step S12, step S13, and step S14 of the first example of the processing procedure. If the result of the comparison at step S22 indicates that the communication resource of the cell of the mobile base station and the communication resource of another cell are the same (step S22: YES), the communication information comparing unit compares the time that the communication information for the other cell and detected by the detecting unit, was received and the time that the communication information for the cell of the mobile base station was transmitted. If the time of transmission is not later than the time of reception (step S23: NO), the current communication resource is selected and determined as the communication resource of the cell of the mobile base station (step S25), ending the processing. If the time of transmission is later than the time of reception (step S23: YES), as at step S13 and step S14 of the first example of the processing procedure, a communication resource to be used in the cell is selected and determined (step S24, step S25), ending the processing. Further, if the time of transmission is not later than the time of reception, the communication resource to be used may be switched.

Figure 10:
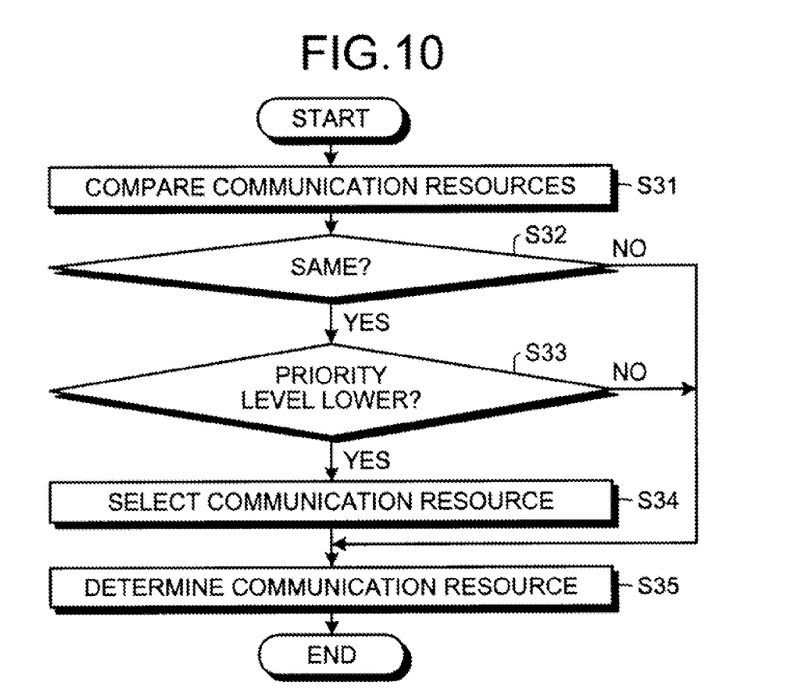
FIG. 10 is a flowchart of a third example of the processing procedure of the mobile base station.

FIG. 10 is a flowchart of a third example of the processing procedure of the mobile base station. As depicted in FIG. 10, in the third example of the processing procedure, step S31, step S32, step S34, and step S35 are respectively identical to step S11, step S12, step S13, and step S14 in the first example of the processing procedure. If the result of the comparison at step S32 indicates that the communication resource of the cell of the mobile base station and the communication resource of another cell are the same (step S32: YES), the priority level comparing unit compares the priority level of the mobile station and the priority level of the other mobile base station (step S33). If the priority level of the mobile base station is not lower than the priority level of the other mobile base station (step S33: NO), processing identical to that at step S23: NO in the second example of the processing procedure is performed. If the priority level of the mobile base station is lower than the priority level of the other mobile base station (step S33: YES), processing identical to that at step S23: YES in the second example of the processing procedure is performed.

Figure 11:
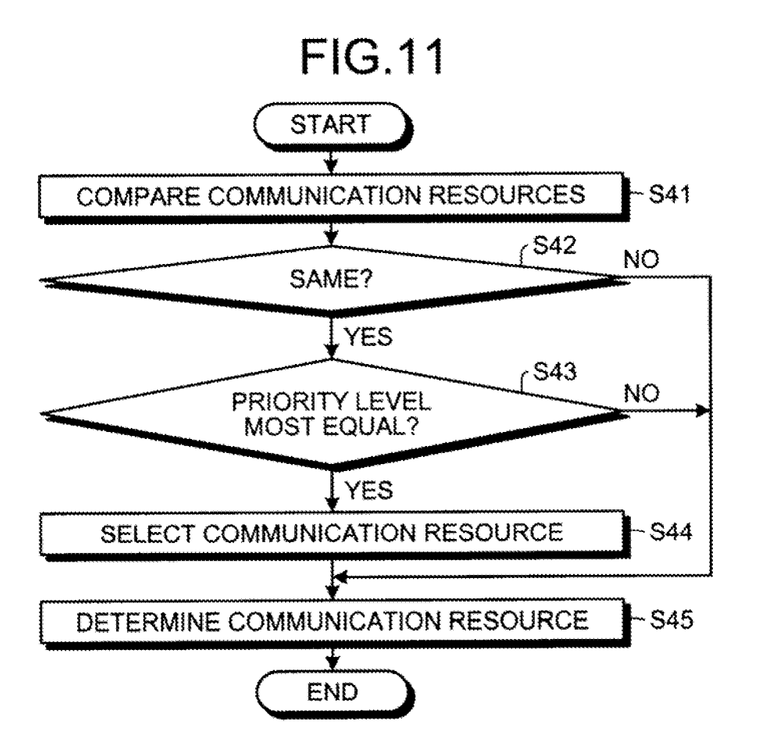
FIG. 11 is a flowchart of a fourth example of the processing procedure of the mobile base station.

FIG. 11 is a flowchart of a fourth example of the processing procedure of the mobile base station. As depicted in FIG. 11, in the fourth example of the processing procedure, step S41, step S42, step S44, and step S45 are respectively identical to step S11, step S12, step S13, and step S14 in the first example of the processing procedure. In the fourth example of the processing procedure, processing identical to that in the third example of the processing procedure is performed, if the priority level of the mobile base station is the same as or lower than the priority level of the other mobile base station (step S43: YES), processing identical to that at step S23: YES in the second example of the processing procedure is performed.

Figure 12:
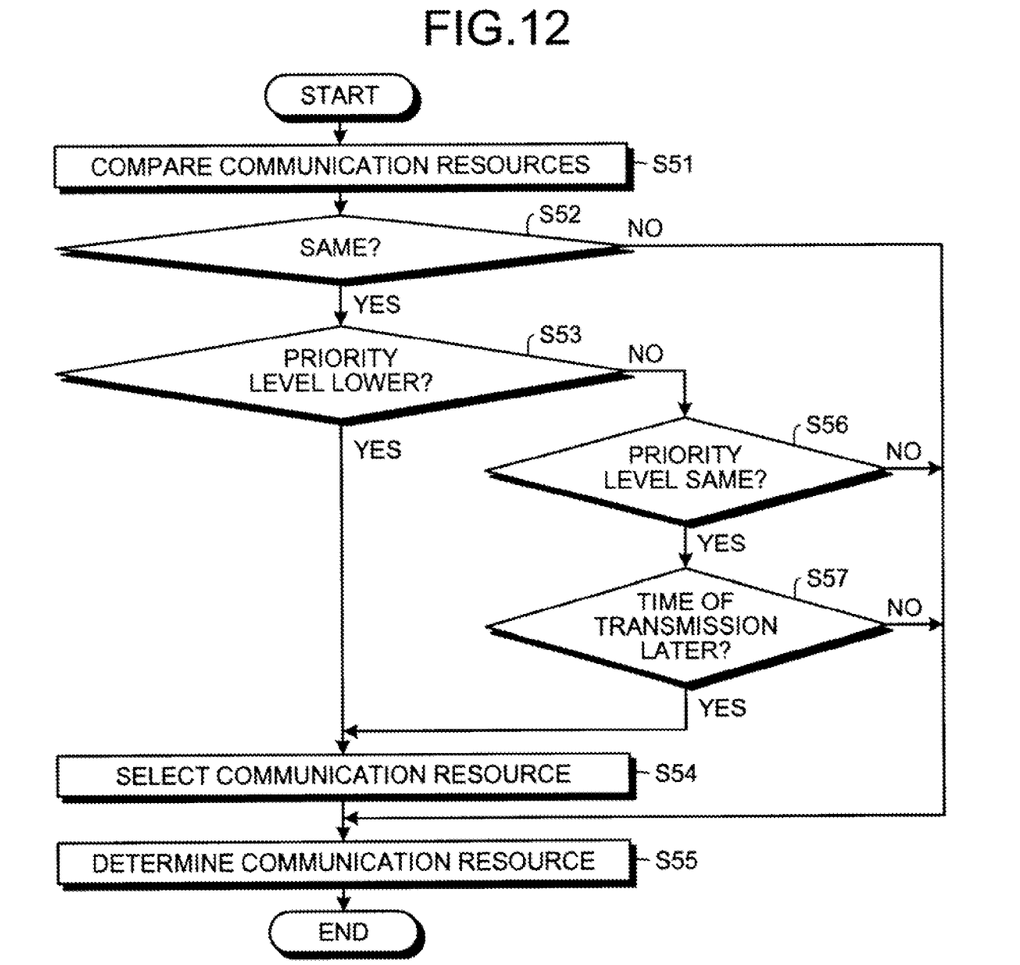
FIG. 12 is a flowchart of a fifth example of the processing procedure of the mobile base station.

FIG. 12 is a flowchart of a fifth example of the processing procedure of the mobile base station. As depicted in FIG. 12, in the fifth example of the processing procedure, step S51, step S52, step S54, and step S55 are respectively identical to step S11, step S12, step S13, and step S14 in the first example of the processing procedure. If the communication resource of the cell of the mobile base station and the communication resource of the other cell are the same (step S52: YES) and the priority level of the mobile station is lower than the priority level of the other mobile base station (step S53: YES), processing identical to that at step S23: YES in the second example of the processing procedure is performed. If the priority level of the mobile base station is not lower than the priority level of the other mobile base station (step S53: NO), the priority level comparing unit determines whether the priority level of the mobile station and the priority level of the other mobile base station are the same (step S56). If the priority level of the mobile station and the priority level of the other mobile base station are the same (step S56: YES), the communication information comparing unit compares the time of reception of the communication information for the other cell and the time of transmission of the communication information for the cell of the mobile base station (step S57). If the time of transmission is later than the time of reception (step S57: YES), processing identical to that at step S23: YES in the second example of the processing procedure is performed. At step S56, if the priority level of the mobile base station and the priority level of the other mobile base station are not the same (step S56: NO), or at step S57 if the time of transmission is not later than the time of reception (step S57: NO), processing identical to that at step S23: NO in the second example of the processing procedure is performed. Further, if the transmission time is not later than the reception time, the communication resource of the cell of the mobile base station may be switched.

Figure 13:
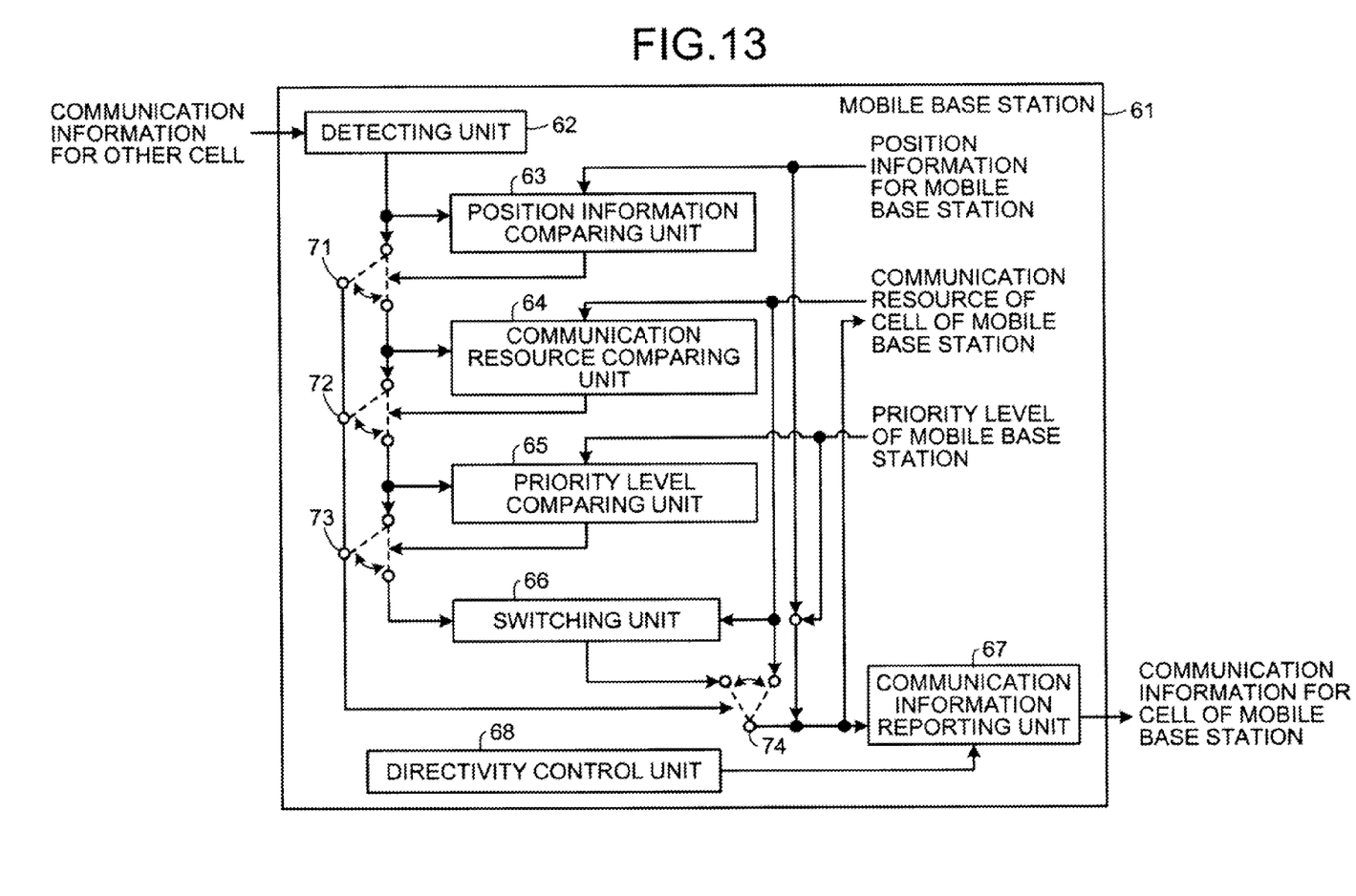
FIG. 13 is a block diagram of a mobile base station according to a third embodiment.

FIG. 13 is a block diagram of a mobile base station according to a third embodiment. In the third embodiment, a mobile base station 61 and a mobile terminal form a group and communicate while moving. As depicted in FIG. 13, mobile base station 61 includes a detecting unit 62, a position information comparing unit 63, a communication resource comparing unit 64, a priority level comparing unit 65, a switching unit 66, a communication information reporting unit 67, and a directivity control unit 68 for an antenna. The detecting unit 62, the position information comparing unit 63, the communication resource comparing unit 64, the priority level comparing unit 65, the switching unit 66, the communication information reporting unit 67 and the directivity control unit 68 have configurations identical to corresponding components in the first embodiment or the second embodiment. In the third embodiment, communication information concerning a mobile base station includes position information for the mobile base station, communication resource information concerning the cell of the mobile base station, and priority level information for the mobile base station.

The detecting unit 62 receives from another mobile base station, communication information for another cell. The detecting unit 62, from the communication information for the other cell, detects, for example, position information, communication resource information, and priority level information concerning the other mobile base station. The position information comparing unit compares the position information concerning the mobile base station and information output from the detecting unit 62. If the distance between the mobile base station and the other mobile base station is greater than a threshold, for example, a first switch 71 switches to a path that does not include the switching unit 66. If the distance between the mobile base stations is equal to or less than the threshold, the communication resource comparing unit 64 compares the communication resource of the cell of the mobile base station and the communication resource of the other cell. If there is a difference between communication resources, for example, a second switch 72 switches to a path that does not include the switching unit 66. If there is no difference between the communication resources, the priority level comparing unit 65 compares the priority level of the mobile base station and the priority level of the other mobile base station. If the priority level of the mobile base station is higher than the priority level of the other mobile base station, for example, a third switch 73 switches to a path that does not include the switching unit 66. If the first switch 71, the second switch 72, or the third switch 73 switches to a path that does not include the switching unit 66, communication resource switching at the switching unit 66 is not performed. Thus, communication information for the cell of the mobile base station becomes information that includes position information concerning the current position of the mobile base station, communication resource information for the cell of the mobile base station, and the priority level of the mobile base station. Communication information concerning the cell of the mobile base station is transmitted in the direction of the directional beam controlled by the directivity control unit 68. If the priority level of the mobile base station is lower than the priority level of the other mobile base station, the switching unit 6 randomly selects a communication resource from among usable communication resources. The communication information reporting unit 67, by a switching by a fourth switch 74, regards position information concerning the current position of the mobile base station, the priority level of the mobile base station, and the communication resource selected by the switching unit 66 as the communication information for the cell of the mobile base station. The communication information reporting unit 67 transmits the communication information for the cell of the mobile base station in the direction of the directional beam controlled by the directivity control unit 68. Further, the communication resource selected by the switching unit is reported to a subordinate mobile terminal and is stored as the communication resource of the cell of the mobile base station.

According to the embodiments, communication information concerning the respective cells of the mobile base stations can be caused to reach farther distances between mobile base stations than the distance covered during communication with a subordinate mobile terminal. Thus, before interference occurs between mobile base stations, the mobile base stations can inform each other of the communication resource used in the respective cells thereof. Further, if the communication resource is the same between the mobile base stations, one or both of the mobile base stations can switch the communication resource to be used in the cell thereof to be different from that of the other mobile base station. Thus, since interference can be prevented when mobile base stations approach one another, communication between the mobile base station and a mobile terminal can be performed. Further, one base station may be a mobile base station and the other base station may be a base station that is stationary. The embodiments can be used in an intelligent transport system (ITS) for communication between vehicles when a roadside device is not in the vicinity.

According the mobile base station, the mobile terminal, the mobile communication system, and the mobile communication method, communication between the mobile base station and the mobile terminal can be performed smoothly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile base station comprising:
   a detecting unit that detects communication information concerning another cell;
   a switching unit that based on the detected communication information, switches a communication resource used by the mobile base station to a communication resource different from that used in the other cell;
   a communication resource reporting unit that reports to a mobile terminal in a cell of the mobile base station, the communication resource switched to by the switching unit; and
   a communication information reporting unit that reports to a base station outside the cell of the mobile base station and with transmission power higher than that used in communication with the mobile terminal in the cell of the mobile base station, communication information concerning the communication resource switched to by the switching unit.

2. The mobile base station according to claim 1, wherein the switching unit switches the communication resource used by the mobile base station, if the communication resource used in the cell of the mobile base station and the communication resource used in the other cell are the same.

3. The mobile base station according to claim 1, wherein the communication information reporting unit includes a directivity control unit that controls directivity of an antenna and changes beam direction.

4. The mobile base station according to claim 1, wherein the switching unit includes a position information comparing unit that compares position of the mobile base station and position of the base station, and switches the communication resource, based on a comparison result obtained by the position information comparing unit.

5. The mobile base station according to claim 4, wherein the communication information reporting unit reports the position of the mobile base station.

6. A mobile communication system comprising:
   a mobile base station that includes:
      a detecting unit that detects communication information concerning another cell,
      a first switching unit that switches, based on the detected communication information, a communication resource used by the mobile base station to a communication resource different from that used in the other cell,
      a communication resource reporting unit that reports to a mobile terminal in a cell of the mobile base station, the communication resource switched to by the first switching unit, and
      a communication information reporting unit that reports to a base station outside the cell of the mobile base station and with transmission power higher than that used in communication with the mobile terminal in the cell of the mobile base station, communication information concerning the communication resource switched to by the first switching unit; and
   a mobile terminal that includes:
      a second switching unit that based on information reported by the mobile base station, switches a communication resource, and
      a communication unit that using the communication resource switched to by the second switching unit, communicates with the mobile base station.

7. The mobile communication system according to claim 6, wherein the first switching unit switches the communication resource used by the mobile base station, if the communication resource used in the cell of the mobile base station and the communication resource used in the other cell are the same.

8. The mobile communication system according to claim 6, wherein the communication information reporting unit includes a directivity control unit that controls directivity of an antenna and changes beam direction.

9. The mobile communication system according to claim 6, wherein the first switching unit includes a position information comparing unit that compares position of the mobile base station and position of the base station, and switches the communication resource used by the mobile base station, based on a comparison result obtained by the position information comparing unit.

10. The mobile communication system according to claim 9, wherein the communication information reporting unit reports the position of the mobile base station.

* * * * *